(12) United States Patent
Tsuchiya et al.

(10) Patent No.: US 10,189,259 B2
(45) Date of Patent: *Jan. 29, 2019

(54) JOINING METHOD, APPARATUS OF MANUFACTURING JOINED BODY, JOINED BODY, INK JET HEAD UNIT, AND INK JET TYPE RECORDING APPARATUS

(71) Applicant: SEIKO EPSON CORPORATION, Tokyo (JP)

(72) Inventors: Hiroyuki Tsuchiya, Suwa (JP); Yasuhide Matsuo, Matsumoto (JP); Kenji Otsuka, Chino (JP); Minehiro Imamura, Chino (JP); Tomohiro Hayashi, Matsumoto (JP); Kei Tadachi, Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/671,035

(22) Filed: Aug. 7, 2017

(65) Prior Publication Data

US 2017/0334207 A1 Nov. 23, 2017

Related U.S. Application Data

(63) Continuation of application No. 14/632,801, filed on Feb. 26, 2015, now Pat. No. 9,789,691.

(30) Foreign Application Priority Data

Feb. 27, 2014 (JP) .................................. 2014-037479

(51) Int. Cl.
*B41J 2/16* (2006.01)
*C09J 183/04* (2006.01)
*C08G 77/00* (2006.01)

(52) U.S. Cl.
CPC ........... *B41J 2/1632* (2013.01); *B41J 2/1612* (2013.01); *B41J 2/1623* (2013.01); *B41J 2/1626* (2013.01); *C09J 183/04* (2013.01); *C08G 77/80* (2013.01)

(58) Field of Classification Search
CPC ...... B41J 2/1632; B41J 2/1612; B41J 2/1623; B41J 2/1626; C09J 183/04
See application file for complete search history.

(56) References Cited

U.S. PATENT DOCUMENTS

| | | |
|---|---|---|
| 5,953,032 A | 9/1999 | Haarz et al. |
| 6,030,071 A | 2/2000 | Komplin et al. |
| 6,153,326 A | 11/2000 | Matsukawa et al. |
| 8,394,543 B2 | 3/2013 | Suyama et al. |

(Continued)

FOREIGN PATENT DOCUMENTS

| | | |
|---|---|---|
| CN | 1203857 A | 1/1999 |
| CN | 1208694 A | 2/1999 |

(Continued)

*Primary Examiner* — Lamson Nguyen
(74) *Attorney, Agent, or Firm* — Maschoff Brennan (57) ABSTRACT

A joining method includes a process of applying a joining material including a thermosetting resin to a member. The joining material includes an addition-type silicone resin. The joining material includes one or more kinds selected from the group consisting of a methyl-based straight silicone resin, a phenyl-based silicone resin, and a modified silicone resin.

17 Claims, 5 Drawing Sheets

(56) References Cited

U.S. PATENT DOCUMENTS

| | | | |
|---|---|---|---|
| 9,050,802 B2 | 6/2015 | Uno | |
| 9,789,691 B2 * | 10/2017 | Tsuchiya | ................ B41J 2/1612 |
| 2010/0302312 A1 | 12/2010 | Yamamoto et al. | |

FOREIGN PATENT DOCUMENTS

| | | | |
|---|---|---|---|
| JP | S62-161513 A | 7/1987 |
| JP | S63-246893 A | 10/1988 |
| JP | 2009-136762 A | 6/2009 |
| JP | 2010-274523 A | 12/2010 |
| JP | 2013-0158991 A | 8/2013 |
| JP | 2015-160384 A | 9/2015 |

* cited by examiner

JOINING METHOD, APPARATUS OF MANUFACTURING JOINED BODY, JOINED BODY, INK JET HEAD UNIT, AND INK JET TYPE RECORDING APPARATUS

REFERENCE TO RELATED APPLICATION

This application is a continuation of U.S. patent application Ser. No. 14/632,801, filed Feb. 26, 2015, which claims priority to Japanese patent application no. 2014-037479 filed Feb. 27, 2014. The foregoing patent applications are incorporated herein by reference.

BACKGROUND

1. Technical Field

The present invention relates to a joining method, an apparatus of manufacturing a joined body, a joined body, an ink jet head unit, and an ink jet type recording apparatus.

2. Related Art

An adhesive has been widely used for joining of various members. However, in joining of members such as constituent components of an ink jet head which have a minute structure, when the adhesive overflows from a target portion, the overflow has a significant adverse effect on the performance of a joined body, and the like.

To solve the problem, a method in which an adhesive is applied onto a film, and then the adhesive is transferred to a member to be joined has been used (for example, refer to JP-A-2009-136762).

However, in the method of the related art, it is difficult to sufficiently prevent the above-described problem from occurring.

SUMMARY

An advantage of some aspects of the invention is to provide a joining method capable of efficiently manufacturing a joined body that is joined by selectively applying a joining material to a target portion, an apparatus of manufacturing a joined body which is capable of efficiently manufacturing the joined body that is joined by selectively applying the joining material to the target portion, a joined body that is joined by selectively applying the joining material to the target portion, an ink jet head unit provided with the joined body that is joined by selectively applying the joining material to the target portion, and an ink jet type recording apparatus.

An aspect of the invention is directed to a joining method including applying a joining material including a thermosetting resin to a member. The joining material includes an addition-type silicone resin.

With this configuration, it is possible to provide a joining method capable of efficiently manufacturing a joined body that is joined by selectively applying the joining material to the target portion.

In the joining method according to the aspect of the invention, it is preferable that the joining material includes one or more kinds selected from the group consisting of a methyl-based straight silicone resin, a phenyl-based silicone resin, and a modified silicone resin.

With this configuration, in the joined body that is finally obtained, an operation of mitigating stress that occurs between a first member and a second member is further enhanced, and thus peeling strength becomes high. Accordingly, it is possible to further enhance joining reliability. In addition, degassing and curing shrinkage during a curing reaction further decrease. In addition, it is possible to further enhance water resistance, solvent resistance, ink resistance, and the like of a joint portion that is formed using the joining material, and thus it is possible to further decrease a swelling ratio of the joint portion. According to this, the joining method may be appropriately applied to manufacturing of a joined body that comes into contact with a liquid.

In the joining method according to the aspect of the invention, it is preferable that a portion of the member, to which the joining material is applied, is adjacent to a portion having a tubular structure.

In a case of joining the member having the above-described structure, a problem related to overflow of a joining material which occurred due to the capillary phenomenon (capillary effect) was more significant in the related art. However, in the aspect of the invention, even when joining a member having the above-described structure, it is possible to effectively prevent the above-described problem from occurring. That is, in a case where the portion of the first member, to which the joining material is applied, is adjacent to a portion having a tubular structure, the effect of the invention is more significantly exhibited.

In the joining method according to the aspect of the invention, it is preferable that a joined body is an ink jet head.

The ink jet head has a minute structure, and is particularly susceptible to an effect due to overflow of the joining material (joint portion) from the target portion. Particularly, in an ink flow channel of the ink jet head, when the overflow of the joining material (joint portion) occurs from the target portion, the following problem and the like occur. Specifically, the joint portion may swell due to the ink, and thus the joining strength of the joint portion may decrease, or ink ejection stability may decrease due to deformation of the ink jet head. In addition, even when the joining material is a water-repellent material, and the problem related to the swelling due to the ink does not occur, if overflow of the joining material (joint portion) from the target portion occurs in an ink flow channel of the ink jet head, the portion is apt to repel the ink, and thus there is a problem in that the ink ejection stability also decreases. In contrast, in the aspect of the invention, it is possible to selectively provide the joint portion to the target portion. Accordingly, even when the invention is applied to the inkjet head, it is possible to effectively prevent the occurrence of the above-described problem in advance. As a result, in a case where the invention is applied to the inkjet head, the effect of the invention is more significantly exhibited.

Another aspect of the invention is directed to an apparatus of manufacturing a joined body using the joining method according to the aspect of the invention.

With this configuration, it is possible to provide an apparatus of manufacturing a joined body which is capable of efficiently manufacturing the joined body that is joined by selectively applying the joining material to the target portion.

Still another aspect of the invention is directed to a joined body that is manufactured using the joining method according to the aspect of the invention.

With this configuration, it is possible to provide a joined body that is joined by selectively applying the joining material to the target portion.

Yet another aspect of the invention is directed to a joined body that is manufactured using the manufacturing apparatus according to the aspect of the invention.

With this configuration, it is possible to provide a joined body that is joined by selectively applying the joining material to the target portion.

It is preferable that the joined body according to the aspect of the invention is an ink jet head.

The ink jet head has a minute structure, and is particularly susceptible to an effect due to overflow of the joining material (joint portion) from the target portion. Particularly, in an ink flow channel of the ink jet head, when the overflow of the joining material (joint portion) occurs from the target portion, the following problem and the like occur. Specifically, the joint portion may swell due to the ink, and thus the joining strength of the joint portion may decrease, or ink ejection stability may decrease due to deformation of the ink jet head. In addition, even when the joining material is a water-repellent material, and the problem related to the swelling due to the ink does not occur, if overflow of the joining material (joint portion) from the target portion occurs in an ink flow channel of the ink jet head, the portion is apt to repel the ink, and thus there is a problem in that the ink ejection stability also decreases. In contrast, in the aspect of the invention, it is possible to selectively provide the joint portion to the target portion. Accordingly, even when the invention is applied to the ink jet head, it is possible to effectively prevent the occurrence of the above-described problem in advance. As a result, in a case where the invention is applied to the ink jet head, the effect of the invention is more significantly exhibited.

Still yet another aspect of the invention is directed to an ink jet head unit including an ink jet head that is the joined body according to the aspect of the invention.

With this configuration, it is possible to provide an ink jet head unit provided with the joined body (ink jet head) that is joined by selectively applying the joining material to the target portion.

Further another aspect of the invention is directed to an ink jet type recording apparatus including the ink jet head unit according to the aspect of the invention.

With this configuration, it is possible to provide an ink jet type recording apparatus provided with the joined body (ink jet head) that is joined by selectively applying the joining material to the target portion.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the attached drawings.

Apparatus of Manufacturing Joined Body, and Joining Method

First, an apparatus of manufacturing a joined body according to the invention, and a joining method will be described.

The joining method according to the invention includes a process of applying a joining material including a thermosetting resin to a member, and the joining material includes an addition-type silicone resin.

As a method of applying the joining material, various methods such as a stamping method and brush application may be employed.

In addition, as the method of applying the joining material, a transfer method may also be employed.

In the following description, description will be mainly given to a case of applying the joining material by the transfer method.

Figure 1:
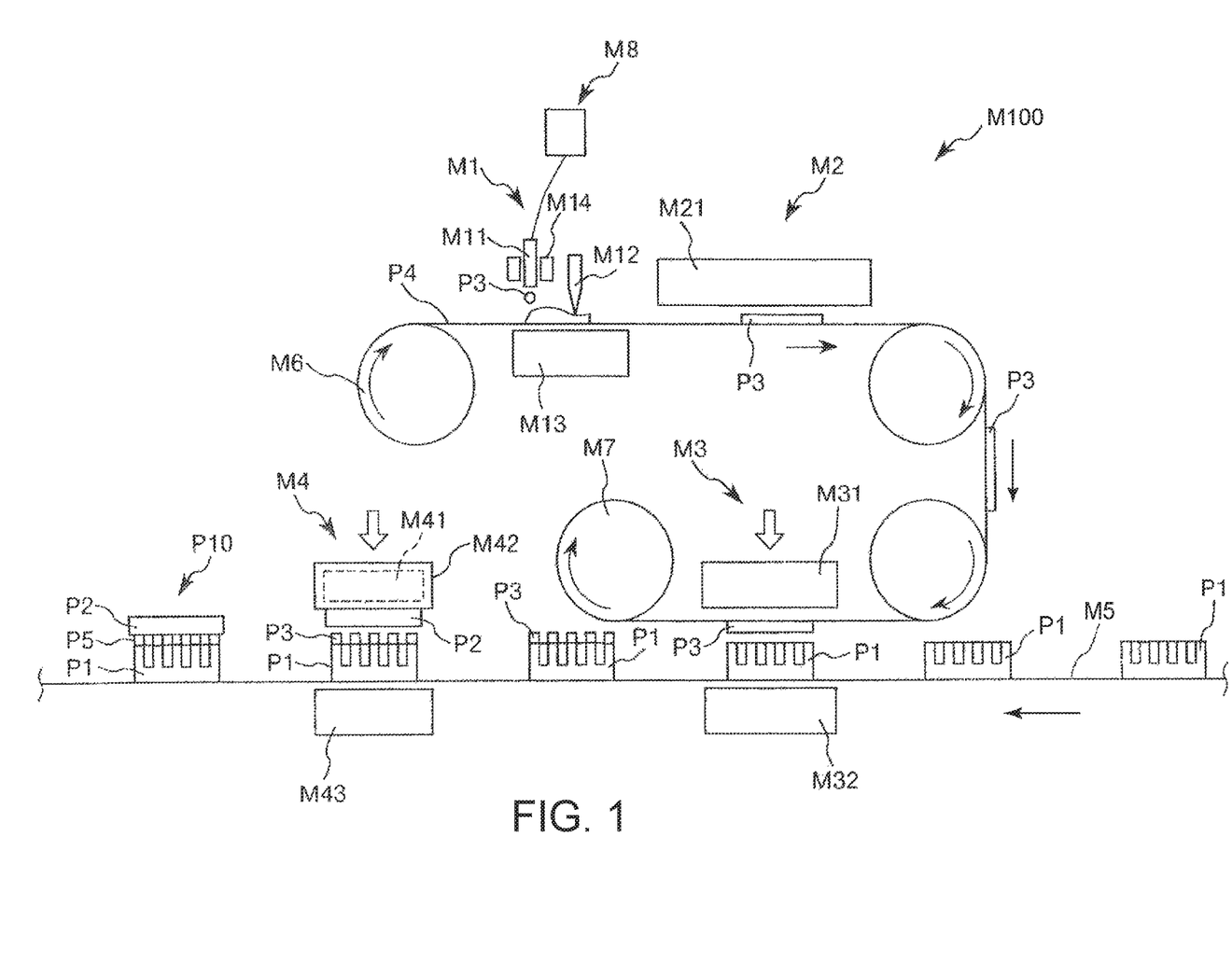
FIG. 1 is a cross-sectional view schematically illustrating a preferred embodiment of an apparatus of manufacturing a joined body according to the invention.

FIG. 1 is a cross-sectional view schematically illustrating a preferred embodiment of an apparatus of manufacturing the joined body according to the invention.

As illustrated in FIG. 1, the apparatus M100 of manufacturing the joined body P10 includes a joining material accommodating section M8 in which a joining material P3 including a thermosetting resin is accommodated, a film forming section M1 in which the joining material P3 in a heated state is applied onto a transfer medium P4 to form a film, a second heating treatment section M2 in which the joining material P3 that is applied to the transfer medium P4 is subjected to a second heating treatment, a transfer section M3 in which the joining material P3 subjected to the second heating treatment is transferred to a first member P1, a third heating treatment section M4 in which the transferred joining material P3 is subjected to a third heating treatment in a state in which the transferred joining material P3 is interposed between the first member P1 and a second member P2, a transporting unit M5 that transports the first member P1, a roller (feeding roller) M6 that feeds the transfer medium P4, and a roller (winding roller) M7 that winds the transfer medium P4.

In addition, a film forming process is performed in the film forming section M1, a second heating treatment process is performed in the second heating treatment section M2, a transfer process is performed in the transfer section M3, and a third heating treatment process is performed in the third heating treatment section M4.

The film forming section M1 is a region in which the film forming process is performed.

The film forming section M1 includes a first heating unit (heater, a viscosity lowering unit) M14 that heats the joining material P3 supplied from the joining material accommodating section M8, a joining material applying unit M11 that applies the joining material P3 in a heated state to the transfer medium P4, a planarization unit (squeegee) M12, that planarizes the joining material P3 applied by the joining material applying unit M11 into a film shape, and a supporting member (supporting stage) M13 that supports the transfer medium P4 during planarization from a surface side opposite to a surface side in which the planarization unit (squeegee) M12 is provided.

The first heating unit (heater, viscosity lowering unit) M14 has a function of heating the joining material P3 in advance prior to application of the joining material P3 from the joining material applying unit M11.

According to this, viscosity of the joining material P3 decreases, and thus it is possible to appropriately perform application of the joining material P3 from the joining material applying unit M11. Particularly, the joining material P3 can be formed into a film having a small thickness as described below. In contrast, in a case of applying a joining material, which is not heated, onto a transfer medium, the viscosity of the joining material is not appropriately adjusted, and thus it is difficult to achieve sufficiently excellent uniformity in the film thickness of the joining material that is formed. Particularly, in a case where the thickness of a film to be formed is small as described below, the above-described tendency becomes significant.

In addition, in this embodiment, heating of the joining material P3 is performed in the film forming section M1 (film forming process). In other words, film formation of the joining material P3 is performed while performing a first heating treatment in the film forming section M1 (film forming process), and thus the film forming section M1 also functions as a first heating treatment section. The invention may have a configuration in which a joining material in a heated state is applied onto the transfer medium. For example, a configuration in which a joining material in a stored state is heated and heating is not performed during film formation is possible. In addition, a joining material that is heated may be supplied to a manufacturing apparatus, and manufacturing of the joined body may be performed using the joining material (the first heating unit may not be provided). However, as is the case with this embodiment, when heating of the joining material P3 is performed during film formation, it is possible to more accurately perform adjustment of the viscosity of the joining material P3, and the like during film formation. In addition, it is possible to more effectively prevent unintentional modification (including a partial curing reaction of the thermosetting resin) of the joining material P3.

The planarization unit (squeegee) M12 has a function of planarizing the joining material P3, which is applied by the joining material applying unit M11, into a film shape.

The supporting member (supporting stage) M13 has a function of supporting the transfer medium P4 from a surface side opposite to a surface side in which the planarization unit (squeegee) M12 is provided when planarization is performed.

According to this, it is possible to effectively prevent unintentional deformation (bending) of the transfer medium P4 during a film forming process, and thus it is possible to more reliably achieve high uniformity in the film thickness of a film to be formed from the joining material P3.

The joining material P3 includes a thermosetting resin.

Examples of the thermosetting resin that constitutes the joining material P3 include a silicone rubber, an addition-type silicone resin, a condensation type silicone resin, an epoxy resin, an acrylic resin, and the like. Among these, the addition-type silicone resin is preferable.

According to this, in the joined body P10 that is finally obtained, an operation of mitigating stress that occurs between the first member P1 and the second member P2 becomes strong, and thus peeling strength becomes high. As a result, it is possible to further enhance joining reliability.

In addition, degassing and curing shrinkage during a curing reaction decrease.

In addition, it is possible to further enhance water resistance, solvent resistance, ink resistance, and the like of the joint portion P5 that is formed using the joining material P3, and thus it is possible make a swelling ratio of the joint portion P5 become small. According to this, the joining method may be appropriately applied to manufacturing of the joined body P10 that comes into contact with a liquid.

Examples of the addition-type silicone resin include a straight silicone resin such as a methyl-based silicone resin, a phenyl-based silicone resin, and methylphenyl-based silicone resin; a modified silicone resin such as a alkyd modified silicone resin, an epoxy modified silicone resin, an acrylic modified silicone resin, and a polyester modified silicone resin; and the like. However, one or more kinds selected from the group consisting of the methyl-based straight silicone resin, the phenyl-based silicone resin, and the modified silicone resin are preferable, and the methyl-based straight silicone resin is more preferable.

According to this, the above-described effects are more significantly exhibited.

The joining material P3 may include components (other components) other than the thermosetting resin. Examples of the components include a solvent, a curing agent, a cross-linking agent, a catalyst, a polymerization initiator, a polymerization inhibitor, a coloring agent, an oxidation inhibitor, a preservative, an antifungal agent, and the like.

As a catalyst, for example, a Pt catalyst, an Al complex, an Fe complex, a rhodium complex, and the like may be used.

When the polymerization inhibitor is included, it is possible to effectively prevent an unintentional polymerization reaction of the thermosetting resin that constitutes the joining material P3 from proceeding before film formation in the film forming section M1 (film forming process), and adjustment of a degree of curing (degree of polymerization) during the second heating treatment becomes easy.

It is preferable that the temperature of the joining material P3 in the film forming process is 40° C. to 80° C.

According to this, it is possible to more appropriately lower the viscosity of the joining material P3 in the film forming process while more effectively preventing the unintentional modification (including a partial curing reaction of the thermosetting resin) of the joining material P3.

It is preferable that the viscosity of the joining material P3 in the film forming process is 100 Pa·s or less.

According to this, flowability of the joining material P3 in the film forming process is further enhanced, and thus even when a film to be formed is relatively thin, it is possible to form the film with higher thickness uniformity.

In addition, in this specification, the viscosity represents a value, which is obtained by measurement under conditions of tool: TA instrument/ARES-2K, a measurement mode: a time sweep test with parallel plate $\phi$25 mm, a measurement frequency: 1 Hz, an applied strain: 1.0%, and a density value used in measurement: 1.00 g/cc, unless otherwise stated.

The transfer medium P4 is configured to be wound around the roller (winding roller) M7 after feeding by the roller (feeding roller) M6. An operation of the roller may be appropriately performed, for example, by a motor.

Examples of a constituent material of the transfer medium P4 include polyethylene terephthalate, a tetrafluoroethylene-perfluoroalkyl vinyl ether copolymer (PFA), a tetrafluoroethylene-hexafluoropropylene copolymer (FEP), polychlorotrifluoroethylene (PCTFE), a cycloolefin polymer (COP), a tetrafluoroethylene-ethylene copolymer (ETFE), and the like, but among these, the polyethylene terephthalate is preferable.

The polyethylene terephthalate is relatively cheap and has appropriate flexibility, and thus handling properties (easiness of handling) thereof are excellent.

According to this, mold release properties of the joining material P3 become excellent, and thus it is possible to more smoothly perform a treatment in a transfer process. Accordingly, it is possible to further enhance productivity of the joined body P10.

The thickness of the transfer medium P4 is not particularly limited, but a thickness of 10 μm to 2000 μm is preferable.

The film thickness of the joining material P3 that is formed in the film forming process is preferably 0.5 μm to 6.0 μm.

According to this, in the joined body P10 that is finally obtained, it is possible to more effectively prevent overflow of the joint portion P5 from the target portion, and the like, and it is possible to further enhance joining strength of the joined body P10.

The second heating treatment section M2 is a region in which a second heating process is performed.

When the second heating treatment is performed, a curing reaction of the thermosetting resin partially progresses (thermosetting resin is temporarily cured), and thus the viscosity of the joining material P3 increases. Accordingly, shape stability is improved. As a result, in the subsequent transfer process, it is possible to effectively prevent unintentional deformation of the joining material P3, and the like, and thus the joining material P3 can be transferred with a desired shape and a desired pattern. As a result, in the joined body P10 that is finally obtained, it is possible to selectively provide the joint portion P5 at the target portion.

The second heating treatment section M2 is provided with a second heating unit (heater, temporary curing unit) M21 that heats the joining material P3 on the transfer medium P4.

In the configuration that is illustrated, the second heating unit M21 is provided on an outer surface side (on a surface side opposite to a surface facing the transfer medium P4) of the joining material P3 on the transfer medium P4, and heating is performed from the surface side. However, a portion at which the second heating unit M21 is provided is not particularly limited, and may be a surface side (rear surface side) opposite to a surface of the transfer medium P4 to which joining material P3 is applied. In addition, a plurality of the second heating units M21 may be used, and for example, the second heating unit M21 may be disposed on both-surface sides of the transfer medium P4 to which the joining material P3 is applied.

It is preferable that the heating temperature in the second heating treatment is 60° C. to 120° C.

According to this, it is possible to further enhance joining strength with the second member P2 in a third heating process while further enhancing shape stability of the joining material P3 after the second heating treatment. In addition, it is possible to relatively shorten a treatment time in the second heating treatment, and thus it is possible to further enhance productivity of the joined body P10.

In addition, it is preferable that a heating time in the second heating treatment is 2 minutes to 10 minutes.

According to this, it is possible to further enhance joining strength with the second member P2 in the third heating process while further enhancing shape stability of the joining material P3 after the second heating treatment. In addition, it is possible to further enhance productivity of the joined body P10.

In addition, the second heating treatment may be performed under constant conditions, or the conditions may be changed during the treatment.

The transfer section M3 is a region in which a transfer process is performed.

The viscosity of the joining material P3 that is transferred in the transfer process increases due to the above-described second heating treatment, and thus the shape stability is improved. Accordingly, in the transfer process, it is possible to effectively prevent unintentional deformation of the joining material P3 and the like in the transfer process, and thus the joining material P3 can be transferred with a desired shape and a desired pattern. As a result, in the joined body P10 that is finally obtained, it is possible to selectively provide the joint portion P5 at the target portion. In addition, the shape stability of the joining material P3 is improved, and thus even when the joining material P3 and the first member P1 are brought into close contact with each other at relatively high pressure in the transfer process, it is possible to effectively prevent unintentional deformation of the joining material P3. Accordingly, in a state after the joining material P3 is transferred, it is possible to further enhance adhesiveness between the first member P1 and the joining material P3 that is transferred, and thus it is possible to effectively prevent an unintentional gap and the like from occurring between the first member P1 and the joining material P3. As a result, it is possible to further enhance joining reliability between the first member P1 and the joint portion P5 in the joined body P10, and thus it is possible to further enhance durability and reliability of the joined body P10 as a whole.

The transfer section M3 is provided with a pressing unit M31 that presses the transfer medium P4 in order for the joining material P3 subjected to the second heating treatment and the first member P1 to come into contact with each other, and a supporting member (transfer stage) M32 that supports the first member P1 during transfer of the joining material P3 to the first member P1 from a surface side opposite to a surface side at which the pressing unit M31 is provided.

Pressurization performed by the pressing unit M31 is performed in a state in which alignment is performed in order for the joining material P3, which is to be transferred, on the transfer medium P4, and the target portion (portion at which the joint portion P5 is to be formed) of the first member P1 to come into contact with each other.

It is preferable that the viscosity of the joining material P3 in the transfer process is 300 Pa·s to 10000 Pa·s.

According to this, it is possible to more reliably prevent unintentional deformation of the joining material P3 in the transfer process, and thus it is possible to more effectively prevent overflow of the joint portion P5 from the target portion, and the like in the joined body P10 that is finally obtained.

It is preferable that the thickness of the joining material P3 that is transferred is 0.5 μm to 3.0 μm.

According to this, in the joined body P10 that is finally obtained, it is possible to more effectively prevent overflow of the joint portion P5 from the target portion, and the like, and it is possible to further enhance joining strength of the joined body P10.

It is preferable that a pressure (pressing force) when the joining material P3 and the first member P1 are brought into close contact with each other is 0.1 MPa to 100 MPa.

As described above, when the pressing force is set to be relatively large, it is possible to further enhance adhesiveness between the joining material P3 and the first member P1. In addition, since the second heating process is performed prior to the transfer process, even when the pressing force is set to be relatively large, the unintentional deformation of the joining material P3 is reliably prevented. Accordingly, in the joined body P10 that is finally obtained, it is possible to more effectively prevent overflow of the joint portion P5 from the target portion, and the like, and it is possible to further enhance joining strength of the joined body P10.

It is preferable that a width of a portion of the first member P1 to which the joining material P3 is applied is 5.0 μm to 20 μm.

As described above, when the width of the portion (portion to be joined) to which the joining material is applied is small, a problem related to overflow of the joining material and the like has occurred in the related art. However, in the embodiment of the invention, even when the width of the portion (portion to be joined) to which the joining material is applied is sufficiently small, it is possible to effectively prevent occurrence of the above-described problem. That is, in a case where the width of the portion of the first member P1 to which the joining material P3 is applied is a value in the above-described range, the effect of the invention is more significantly exhibited.

It is preferable that the portion of the first member P1 to which the joining material P3 is applied is adjacent to a portion having a tubular structure.

In a case of joining the member having the above-described structure, problems related to overflow of the joining material and the like more significantly occur due to a capillary phenomenon in the related art. However, in the embodiment of the invention, even when joining a member having the above-described structure, it is possible to effectively prevent the above-described problem from occurring. That is, in a case where the portion of the first member P1, to which the joining material P3 is applied, is adjacent to a portion having a tubular structure, the effect of the invention is more significantly exhibited.

The third heating treatment section M4 is a region in which the third heating process is performed.

The thermosetting resin that constitutes the joining material P3 is mainly cured by the third heating treatment, and thus the joint portion P5 is formed. According to this, the joined body P10, in which the first member P1 and the second member P2 are connected to each other through the joint portion P5, is obtained.

In the joining material P3 that comes into contact with the second member P2, the thermosetting resin is temporarily cured by the above-described second heating treatment, and thus the viscosity thereof increases and shape stability is improved. Accordingly, unintentional deformation of the joining material P3 (joint portion P5) and the like due to an increase in flowability of the joining material P3 are effectively prevented during joining (third heating process) between the first member P1 and the second member P2, and thus it is possible to selectively provide the joint portion P5 at the target portion. In addition, the shape stability of the joining material P3 is improved, and thus even when the joining material P3 and the second member P2 are brought into close contact with each other at a relatively high pressure, it is possible to effectively prevent unintentional deformation of the joining material P3. Accordingly, it is possible to further enhance adhesiveness between the second member P2 and the joint portion p5, and thus it is possible to effectively prevent an unintentional gap and the like from occurring between the second member P2 and the joint portion P5. In addition, even when adhesiveness between the first member P1 and the joining material P3 is not sufficient in the above-described process, when the second member P2 and the joining material P3 are brought into close contact with each other at a relatively large pressure in the third heating process, adhesiveness between the first member P1 and the joining material P3 is also improved. Accordingly, it is possible to further enhance joining reliability between the second member P2 and the joint portion P5, and joining reliability between the first member P1 and the joint portion P5 in the joined body P10, and thus it is possible to further enhance durability and reliability of the joined body P10 as a whole.

The third heating treatment section M4 is provided with a third heating unit (heater, main curing unit) M41 that heats the joining material P3 in a state of being interposed between the first member P1 and the second member P2, a pressing unit M42 that presses the second member P2 in order for the joining material P3 transferred onto the first member P1 and the second member P2 to come into contact with each other, and a supporting member M43 that supports the first member P1 in a pressed state by the pressing unit M42.

In the configuration that is illustrated, the third heating unit M41 is integrally provided with the pressing unit M42, and performs heating on a second member P2 side. However, a portion at which the third heating unit M41 is provided is not particularly limited, and for example, the third heating unit M41 may be provided independently from the pressing unit M42. In addition, for example, the third heating unit M41 may be provided on a supporting member M43 side.

It is preferable that a pressure (pressing force) when the joining material P3 and the second member P2 are brought into close contact with each other is 0.01 MPa to 10 MPa.

As described above, when the pressing force is set to be relatively large, it is possible to further enhance adhesiveness between the joining material P3 and the second member P2, and adhesiveness between the joining material P3 and the first member P1. In addition, since the second heating process is performed prior to the third heating process, even when the pressing force is set to be relative large, the unintentional deformation of the joining material P3 is reliably prevented. Accordingly, in the joined body P10 that is finally obtained, it is possible to more effectively prevent overflow of the joint portion P5 from the target portion, and the like, and it is possible to further enhance joining strength in the joined body P10.

It is preferable that the heating temperature in the third heating treatment is 60° C. to 250° C.

According to this, it is possible to further enhance joining strength in the joined body P10 while reliably preventing deterioration and the like of constituent materials of the first member P1 and the second member P2. In addition, it is possible to relatively shorten a treatment time in the third heating treatment, and thus it is possible to further enhance productivity of the joined body P10.

In addition, it is preferable that the heating time in the third heating treatment is 3 minutes to 60 minutes.

According to this, it is possible to further enhance the joining strength in the joined body P10 while reliably preventing deterioration of the constituent materials of the first member P1 and the second member P2, and the like. In addition, it is possible to further enhance productivity of the joined body P10.

In addition, the third heating treatment may be performed under constant conditions, or the conditions may be changed during the treatment. For example, in the third heating treatment, a first step may be performed at a temperature of $T_1$ [° C.] and a pressure of $P_1$ [Pa], and then a second step may be performed at a temperature of $T_2$ [° C.] which is higher than $T_1$, and a pressure of $P_2$ [Pa] which is higher than $P_1$.

According to this, it is possible to further enhance joining reliability between the second member P2 and the joint portion P5, and joining reliability between the first member P1 and the joint portion P5 in the joined body P10 while more effectively preventing unintentional deformation of the joining material P3 (joint portion P5). Accordingly, it is possible to further enhance durability and reliability of the joined body P10 as a whole.

According to the apparatus of manufacturing the joined body according to the invention and the joining method, it is possible to efficiently manufacture the joined body in which the joining material is selectively applied to the target portion for joining.

Joined Body

Next, the joined body according to the invention will be described.

The joined body according to the invention is manufactured using the joining method according to the invention, and the apparatus of manufacturing the joined body according to the invention as described above.

According to this, it is possible to provide a joined body that is joined by selectively applying the joining material to the target portion.

The joined body according to the invention may be an arbitrary article, but an ink jet head is preferable.

The ink jet head has a minute structure, and is particularly susceptible to an effect due to overflow of the joining material (joint portion) from the target portion.

Particularly, in an ink flow channel of the ink jet head, when the overflow of the joining material (joint portion) occurs from the target portion, the following problem and the like occur. Specifically, the joint portion may swell due to the ink, and thus the joining strength of the joint portion may decrease, or ink ejection stability may decrease due to deformation of the ink jet head.

In addition, even when the joining material is a water-repellent material, and the problem related to the swelling due to the ink does not occur, if overflow of the joining material (joint portion) from the target portion occurs in an ink flow channel of the ink jet head, the portion is apt to repel the ink, and thus there is a problem in that the ink ejection stability also decreases.

In contrast, in the embodiment of the invention, it is possible to selectively provide the joint portion to the target portion. Accordingly, even when the invention is applied to the ink jet head, it is possible to effectively prevent occurrence of the above-described problem in advance.

As a result, in a case where the invention is applied to the ink jet head, the effect of the invention is more significantly exhibited.

Hereinafter, the invention will be described in detail with reference to a specific example in which the invention is applied to an ink jet head.

Figure 2:
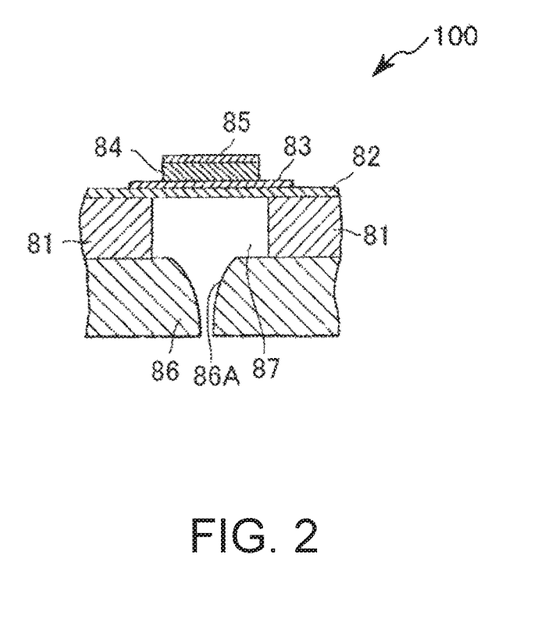
FIG. 2 is a cross-sectional view schematically illustrating a preferred embodiment of an ink jet head to which the invention is applied.
Figure 3:
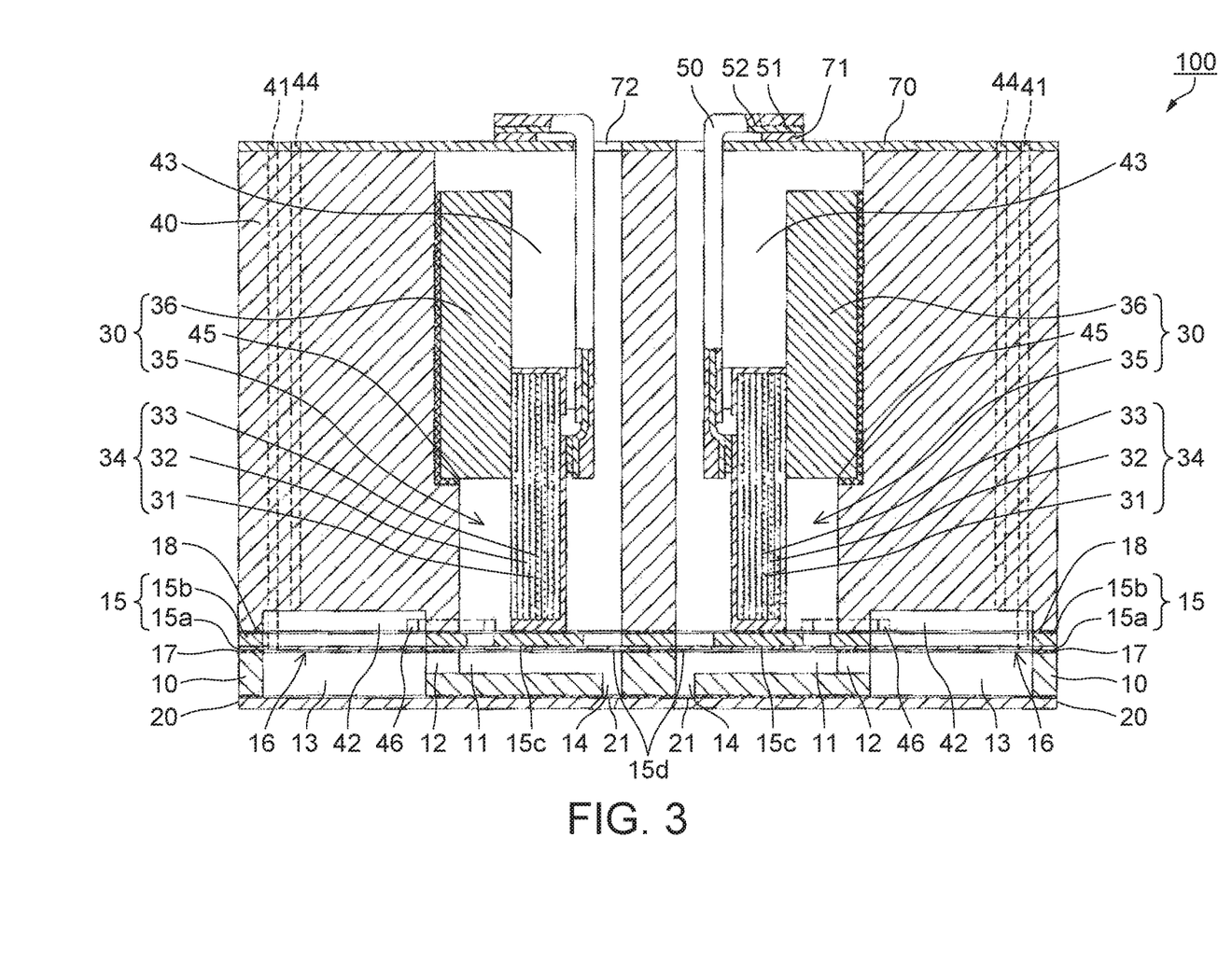
FIG. 3 is a cross-sectional view schematically illustrating another preferred embodiment of the ink jet head to which the invention is applied.
Figure 4:
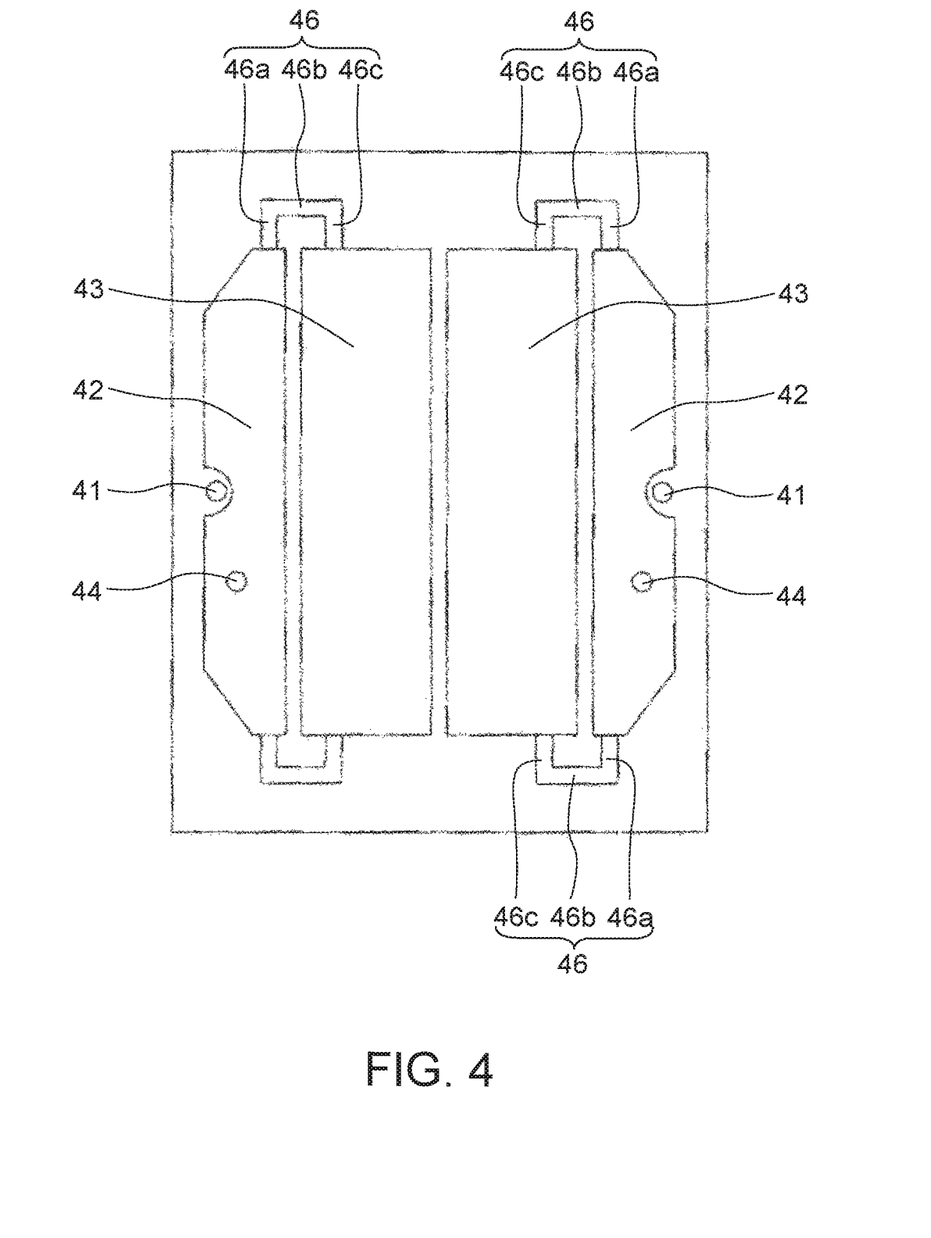
FIG. 4 is a bottom view of a case of the ink jet head illustrated in FIG. 3.

FIG. 2 is a cross-sectional view schematically illustrating a preferred embodiment of the ink jet head to which the invention is applied, FIG. 3 is a cross-sectional view schematically illustrating another preferred embodiment of the ink jet head to which the invention is applied, and FIG. 4 is a bottom view of a case of the ink jet head illustrated in FIG. 3.

An ink jet head 100 illustrated in FIG. 2 includes a silicon substrate 81 in which an ink reservoir 87 is formed, a vibrating plate 82 that is formed on the silicon substrate 81, a lower electrode 83 that is formed on a desired position on the vibrating plate 82, a piezoelectric thin film 84 that is formed on the lower electrode 83 at a position corresponding to the ink reservoir 87, an upper electrode 85 that is formed on the piezoelectric thin film 84, and a second substrate 86 that is joined to the lower surface of the silicon substrate 81. The second substrate 86 is provided with an ink ejecting nozzle 86A that communicates with the ink reservoir 87.

In the ink jet head 100, ink is supplied to the ink reservoir 87 through an ink flow channel (not illustrated). Here, a voltage is applied to the piezoelectric thin film 84 through the lower electrode 83 and the upper electrode 85, the piezoelectric thin film 84 is deformed and thus the inside of the ink reservoir 87 enters a negative pressure state, and thus a pressure is applied to the ink. Due to the pressure, the ink is ejected from a nozzle, and ink jet recording is performed.

For example, the ink jet head 100 may have the following structure. Specifically, a Si thermal oxide film is set as the vibrating plate 82, and a thin film piezoelectric element including the lower electrode 83, the piezoelectric thin film 84, and the upper electrode 85 is integrally formed on an upper portion of the vibrating plate 82 by a thin film process. In addition, a chip including a single crystal silicon substrate 81 in which a cavity (ink reservoir) 87 is formed, and a stainless steel nozzle plate (second substrate) 86 provided with the ink ejecting nozzle 86A that ejects ink are joined by the joining method according to the invention.

Here, as the piezoelectric thin film 84, for example, a thin film constituted by ternary PZT, which is a material having high piezoelectric strain constant d31 and in which lead-magnesium niobate is added as a third component, may be used to obtain a relatively large displacement amount. In addition, the thickness of the piezoelectric thin film 84 may be set to approximately 2 μm.

In a case where the invention is applied for joining of the constituent members of the ink jet head having the above-described structure, it is possible to selectively apply the joining material to the target portion, and thus reliability of the inkjet head (joined body) that is obtained increases.

In addition, the ink jet head 100 illustrated in FIGS. 3 and 4 includes a flow channel formed substrate 10 having pressure generating chambers 11, a nozzle plate 20, in which a plurality of nozzles 21 respectively communicating with the pressure generating chambers 11 are punched, and a vibrating member 15 that is joined to a surface of the flow channel formed substrate 10 on a side opposite to the nozzle plate 20. In addition, the ink jet head 100 of this embodiment includes a piezoelectric element unit 30 including a plurality of piezoelectric elements 35 provided in regions corresponding to the pressure generating chambers 11 on the vibrating member 15, and a case 40 that is joined to one surface of the flow channel formed substrate 10 through the vibrating member 15. In addition, in this embodiment, a reservoir 13, which is a common liquid chamber of the pressure generating chambers 11, is formed in the flow channel formed substrate 10, and the flow channel formed substrate 10 is configured also as a reservoir formed substrate.

In the flow channel formed substrate 10, the pressure generating chambers 11 are partitioned by a partition wall at a surface portion on one surface side of the flow channel formed substrate 10, and are arranged in parallel with each other in a width direction of the flow channel formed substrate 10. In addition, in this embodiment, the pressure generating chambers 11 are formed in two rows each including a plurality of the pressure generating chamber 11 arranged in parallel. In addition, the reservoir 13, to which ink is supplied through an ink introducing channel 41 that is a liquid introducing channel of the case 40, is formed one by one on an outer side of each of the rows of the pressure generating chambers 11 to penetrate through the flow channel formed substrate 10 in a thickness direction thereof.

In addition, the reservoir 13 and each of the pressure generating chambers 11 communicate with each other through an ink supply channel 12, and ink is supplied to the pressure generating chamber 11 through the ink introducing channel 41, the reservoir 13, and the ink supply channel 12. In this embodiment the ink supply channel 12 is formed with a width narrower than that of the pressure generating chamber 11, and plays a role of constantly retaining flow channel resistance of the ink that is introduced from the reservoir 13 to the pressure generating chamber 11.

In addition, a nozzle communication hole 14, which penetrates through the flow channel formed substrate 10, is formed on end side of the pressure generating chamber 11 which is opposite to the reservoir 13. That is, in this embodiment, the reservoir 13, the ink supply channel 12, the pressure generating chamber 11, and the nozzle communication hole 14 are provided to the flow channel formed substrate 10 as a liquid flow channel. In this embodiment, the flow channel formed substrate 10 is configured by a silicon single crystal substrate, and the pressure generating chamber 11, the reservoir 13, and the like, which are provided to the flow channel formed substrate 10, are formed by etching the flow channel formed substrate 10.

The nozzle plate 20, in which the plurality of nozzles 21 that eject ink are punched, is joined to one surface of the flow channel formed substrate 10, and each of the nozzles 21 communicates with each of the pressure generating chamber 11 through the nozzle communication hole 14 that is provided to the flow channel formed substrate 10.

In addition, the vibrating member 15 is joined to the other surface of the flow channel formed substrate 10, that is, an opening surface of the pressure generating chamber 11 with an adhesive layer 17, and each of the pressure generating chambers 11 is sealed with the vibrating member 15. In addition, as illustrated in the drawing, the vibrating member 15 has an area that is approximately the same as an area of the other surface of the flow channel formed substrate 10, and the joining of the vibrating member 15 is performed to cover the entirety of the other surface of the flow channel formed substrate 10.

For example, the vibrating member 15 is formed as a composite plate including an elastic membrane 15a constituted by an elastic member such as a resin film, and a supporting plate 15b which supports the elastic membrane 15a and is formed from a metallic material, and an elastic membrane 15a side is joined to the flow channel formed substrate 10. In this embodiment, the elastic membrane 15a is constituted by a polyphenylene sulfide (PPS) film having a thickness of approximately several μm, and the supporting plate 15b is constituted by stainless steel sheet (SUS) having a thickness of approximately several tens μm.

In addition, a region of the vibrating member 15, which faces a peripheral portion of each of the pressure generating chamber 11, is configured as a thin portion 15d from which the supporting plate 15b is removed and which is substantially constituted by only the elastic membrane 15a. The thin portion 15d forms one surface of the pressure generating chamber 11. In addition, an island portion 15c, which is constituted by a part of the supporting plate 15b with which a tip end of each of the piezoelectric elements 35 comes into contact, is provided on an inner side of the thin portion 15d. In addition, a region of the vibrating member 15, which faces the reservoir 13, is configured as a vibrating portion 16 from which the supporting plate 15b is removed and which is constituted by only the elastic membrane 15a. When a variation in a pressure inside the reservoir 13 occurs, the vibrating portion 16 is deformed to perform a role of absorbing the pressure variation to constantly retain the pressure inside the reservoir 13. In addition, the case 40 is joined onto the vibrating member 15 with an adhesive layer 18. That is, the case 40 of this embodiment is joined to the flow channel formed substrate 10 through the vibrating member 15.

As illustrated in FIG. 3, the case 40 is provided with a space portion 42 constituted by a concave portion at a position facing the vibrating portion 16. The space portion 42 has a height with which deformation of the vibrating portion 16 is not hindered, and the space portion 42 communicates with an outer space through a case through-hole 44 that is a hole which penetrates through the case 40 and is opened to the air. According to this, the pressure inside the space portion 42 is always retained constantly with that of an outer space. In addition, a piezoelectric element accommodating portion 43 consisting of a penetration portion that penetrates through the case 40, is provided to the case 40 at a position facing the thin portion 15d. In addition, a stepped portion 45 is provided on an ink introducing channel 41 side of the piezoelectric element accommodating portion 43, and the following fixing substrate 36 of the piezoelectric element unit 30 is joined to the stepped portion 45.

In addition, a wiring substrate 70, which is provided with a plurality of conductive pads 71 to which wiring layers of the following flexible printed substrate 50 are respectively connected, is fixed to a surface of the case 40 which is opposite to the flow channel formed substrate 10. A slit-shaped opening 72 is formed in the wiring substrate 70 at a region facing the piezoelectric element accommodating portion 43 of the case 40, and the piezoelectric element accommodating portion 43 communicates with an outer space through the opening 72. In addition, the piezoelectric element unit 30 including the piezoelectric element 35 is accommodated inside the piezoelectric element accommodating portion 43.

The piezoelectric element unit 30 includes a plurality of the piezoelectric elements 35 which are respectively provided to face the pressure generating chambers 11 and which change a pressure inside liquid flow channels including the pressure generating chamber 11 and the reservoir 13, and the fixing substrate 36 that attaches the piezoelectric elements 35 to the case 40.

In this embodiment, the piezoelectric elements 35 are integrally formed in one piezoelectric element unit 30. That is, a piezoelectric material 31, and electrode forming materials 32 and 33 are alternately laminated in a sandwich shape in a vertical direction to form a piezoelectric element forming member 34, and the piezoelectric element forming member 34 is divided into a comb teeth shape in correspondence with each of the pressure generating chambers 11 to form each of the piezoelectric elements 35. That is, in this embodiment, the plurality of piezoelectric elements 35 are integrally formed. In addition, a tip end of each of the piezoelectric elements 35 is joined to an island portion 15c of the vibrating member 15 with an adhesive (joining agent), and a base end thereof, which is configured as an inactive region not contributing to vibration, is fixed to the fixing substrate 36. As described above, the fixing substrate 36 to which the piezoelectric element 35 is fixed is joined to the case 40 at the stepped portion 45 of the piezoelectric element accommodating portion 43. According to this, the piezoelectric element unit 30 is accommodated in the piezoelectric element accommodating portion 43 of the case 40 and is fixed thereto.

In addition, as described above, the fixing substrate 36 is provided integrally with the piezoelectric element 35 to constitute the piezoelectric element unit 30, and the piezoelectric element unit 30 is aligned and fixed to the case 40. At this time, the alignment of the vibrating member 15 (island portion 15c) of the piezoelectric element 35 is performed with an outer peripheral surface of the fixing substrate 36 and an inner surface of the piezoelectric element accommodating portion 43 of the case 40. According to this, the alignment can be more easily and accurately performed in comparison to alignment by directly gripping the piezoelectric element 35 formed from a brittle material.

A material that constitutes the fixing substrate 36 is not particularly limited. However, for example, the fixing substrate 36 may be appropriately constituted with aluminum, copper, iron, stainless steel, or the like. In addition, the flexible printed substrate 50, which includes a wiring layer 51 that supplies a signal for driving of the piezoelectric elements 35, is connected to a surface of the piezoelectric element 35 on a side opposite to the fixing substrate 36 in the vicinity of the base end of the piezoelectric element 35 of the piezoelectric element unit 30.

The flexible printed substrate 50 consists of a flexible printing circuit (FPC), a tape carrier package (TCP), and the like. Specifically, for example, the flexible printed substrate 50 has a configuration in which the wiring layer 51 having a predetermined pattern is formed with copper foil and the like on a surface of a base film 52 formed from polyimide and the like, and a region of the wiring layer 51 other than a region such as a terminal portion connected to the piezoelectric element 35 is covered with an insulating material such as a resist.

In the wiring layer 51 of the flexible printed substrate 50, a base end side thereof is connected to the electrode forming materials 32 and 33, which constitute the piezoelectric element 35, for example, with solder, an anisotropic conductive material, and the like.

On the other hand, a tip end side of the wiring layer 51 is electrically connected to the conductive pad 71 of the wiring substrate 70 provided on the case 40. The flexible printed substrate 50 is led out from an opening 72 of the wiring substrate 70 to the outside of the piezoelectric element accommodating portion 43, and a lead-out region is bent and is connected to the conductive pad 71.

In addition, in the ink jet head 100 of this embodiment, as illustrated in FIG. 4, the piezoelectric element accommodating portion 43 and the space portion 42 communicate with each other through the communication channel 46.

The communication channel 46 is a passage through which the piezoelectric element accommodating portion 43 and the space portion 42 communicate with each other. In this embodiment, the communication channel 46 is formed on a bottom surface of the case 40 by removing a part of a surface of the case 40 on a flow channel formed substrate 10 side.

In addition, the communication channel 46 of this embodiment is provided at a portion that does not overlap a flow channel including the pressure generating chamber 11 in a lamination direction of the flow channel formed substrate 10, the vibrating member 15, and the case 40. Specifically, the communication channel 46 is provided on an outer side region in a parallel arrangement direction of the pressure generating chambers 11 in comparison to the space portion 42 and both ends of the piezoelectric element accommodating portion 43.

In addition, the communication channel 46 includes a first communication portion 46a which continues from the space portion 42 and extends from an end of the space portion 42 in a longitudinal direction thereof to an outer side along the parallel arrangement direction of the pressure generating chambers 11, a second communication portion 46b which continues from the first communication portion 46a and extends along a longitudinal direction of the pressure generating chambers 11, and a third communication portion 46c which continues from the second communication portion 46b, inwardly extends along the parallel arrangement direction of the pressure generating chambers 11, and continues to the piezoelectric element accommodating portion 43. The piezoelectric element accommodating portion 43 and the space portion 42 communicate with each other through the communication channel 46. In this embodiment, the communication channel 46 is formed in a surface of the case 40 on a flow channel formed substrate 10 side. That is, the communication channel 46 is provided as a concave portion in the surface of the case 40 on the flow channel formed substrate 10 side.

When the communication channel 46 is provided, the piezoelectric element accommodating portion 43 and the space portion 42 constitute a flow channel through which air flows, and thus a volatile gas inside the space portion 42 is relatively easily discharged to an outer space.

In the ink jet head 100, a volume of each of the pressure generating chambers 11 is changed due to deformation of the piezoelectric element 35 and the vibrating member 15, and thus ink droplets are ejected from each nozzle 21. Specifically, when ink is supplied to the reservoir 13 from a liquid storage unit (not illustrated) through the ink introducing channel 41 that is a liquid introducing channel, the ink is distributed to the pressure generating chambers 11 through the ink supply channel 12. In addition, when a voltage is applied to or released from a predetermined piezoelectric element 35 by a drive signal supplied from a drive circuit (not illustrated), the piezoelectric element 35 is contracted or extended to cause a pressure variation in the pressure generating chamber 11, whereby the ink is ejected from the nozzle 21.

The invention may be applied for formation of the joint portion that joins constituent members of the above-described ink jet head.

Ink Jet Head Unit, Ink Jet Type Recording Apparatus

Next, an ink jet head unit and an ink jet type recording apparatus according to the invention will be described.

Figure 5:
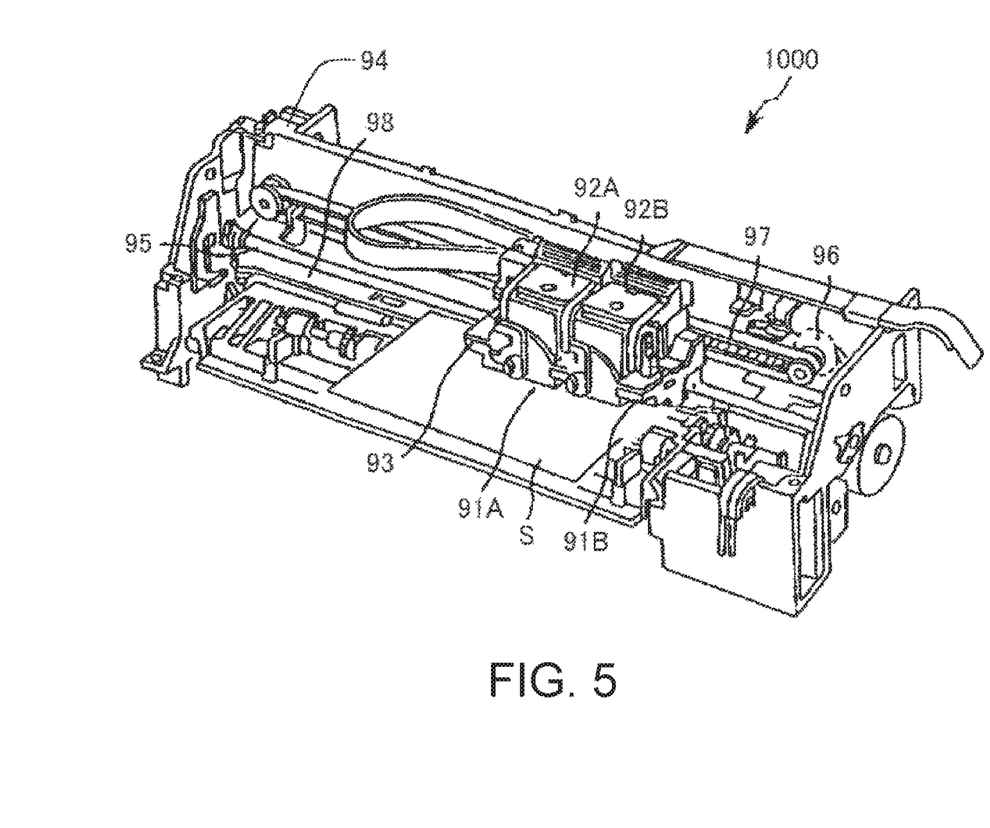
FIG. 5 is a schematic view illustrating a preferred embodiment of an ink jet type recording apparatus according to the invention.

FIG. 5 is a schematic view illustrating a preferred embodiment of the ink jet type recording apparatus according to the invention.

As illustrated in FIG. 5, the inkjet type recording apparatus 1000 includes an ink jet head units (recording head units) 91A and 91B, cartridges 92A and 92B, a carriage 93, an apparatus main body 94, a carriage shaft 95, a drive motor 96, a timing belt 97, and a platen 98.

The cartridges 92A and 92B, which constitute an ink supply unit, are detachably provided to the recording head units 91A and 91B which are provided with an ink jet head (recording head) as the joined body according to the invention as described above, and the carriage 93 on which the recording head units 91A and 91B are mounted is provided to the carriage shaft 95 attached to the apparatus main body 94 in a movable manner along an axial direction. For example, the recording head units 91A and 91B may set to eject a black ink composition and a color ink composition, respectively.

In addition, when a driving force of the drive motor 96 is transmitted to the carriage 93 through a plurality of gears and a timing belt 97 (not illustrated), the carriage 93, on which the recording head units 91A and 91B are mounted, moves along the carriage shaft 95. On the other hand, the platen 98 is provided to the apparatus main body 94 along the carriage shaft 95, and a recording sheet S, which is a recording medium such as paper fed from a paper feeding roller (not illustrated) and the like, is transported while being wound around the platen 98.

Hereinbefore, a preferred embodiment of the invention has been described, but the invention is not limited thereto.

For example, in the above-described embodiment, description has been given to a configuration in which a continuous process is performed using a transfer medium and the like which are transported by a roller. However, in the invention, batch processing may be performed.

In addition, in the manufacturing apparatus according to the invention, arrangement of respective constituent elements is not limited to the above-described arrangement.

In addition, in the above-described embodiment, description has been given to a configuration in which different members are used as the first heating unit, the second heating unit, and the third heating unit. However, a common heating unit may be used for two or more units among the first heating unit, the second heating unit, and the third heating unit.

In addition, the manufacturing apparatus according to the invention may include a cleaning unit that cleans the transfer medium after transfer of the joining material. According to this, the transfer medium can be appropriately and repetitively used, and thus there is an advantage from the viewpoints of reduction in production cost of the joined body, and resource saving.

In addition, in the above-described embodiment, description has been given to a case in which the invention is applied to joining of two members, but the invention may be applied to joining of three or more members.

In addition, in the joining method according to the invention, a pre-treatment process, an intermediate treatment process, and a post-treatment process may also be performed as necessary.

In addition, in the description, the ink jet head has been representatively described as the joined body. However, the joined body according to the invention may be a member other than the ink jet head, and may be appropriately applied, for example, to MEMS, an optical element, and the like. These also have a minute structure, and thus the application effect of the invention is significantly exhibited.

The entire disclosure of Japanese Patent Application No. 2014-037479, filed on Feb. 27, 2014 is expressly incorporated by reference herein.

What is claimed is:

1. A joining method, comprising:
applying a joining material to a transfer medium, the joining material joining a first member and a second member;
increasing a viscosity of the joining material that applied to the transfer medium than the viscosity of the joining material in applying the joining material to the transfer medium;
transferring the joining material to the first member; and
joining the first member and the second member by the joining material that transferred to the first member.

2. A joining method according to claim 1,
wherein the joining material includes a thermosetting resin.

3. A joining method according to claim 2,
wherein increasing the viscosity of the joining material that applied to the transfer medium increases the viscosity of the joining material by applying a first heat to the joining material.

4. A joining method according to claim 3,
applying a second heat to set the joining material joined the first member and the second member.

5. A joining method according to claim 2,
wherein the joining material includes an addition-type silicone resin.

6. The joining method according to claim 5,
wherein the joining material includes one or more kinds selected from the group consisting of a methyl-based straight silicone resin, a phenyl-based silicone resin, and a modified silicone resin.

7. The joining method according to claim 1,
wherein a portion of the first member, to which the joining material is applied, is adjacent to a portion having a tubular structure.

8. The joining method according to claim 1,
wherein a joined body is an ink jet head.

9. An apparatus of manufacturing a joined body,
wherein the method according to claim 1 is executed.

10. A joined body that is manufactured using the manufacturing apparatus according to claim 9.

11. The joined body according to claim 10,
wherein the joined body is an ink jet head.

12. An ink jet head unit, comprising:
the joined body according to claim 11.

13. An ink jet type recording apparatus, comprising:
the ink jet head unit according to claim 12.

14. A joined body that is manufactured using the joining method according to claim 1.

15. The joined body according to claim 14,
wherein the joined body is an ink jet head.

16. An ink jet head unit, comprising:
the joined body according to claim 15.

17. An ink jet type recording apparatus, comprising:
the ink jet head unit according to claim 16.

* * * * *